(12) United States Patent
Abarra et al.

(10) Patent No.: US 7,588,842 B1
(45) Date of Patent: Sep. 15, 2009

(54) PERPENDICULAR MAGNETIC RECORDING MEDIUM WITH A PINNED SOFT UNDERLAYER

(75) Inventors: E. Noel Abarra, Santa Clara, CA (US); Min Zheng, Milpitas, CA (US); Paramjit Gill, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 417 days.

(21) Appl. No.: 11/218,771

(22) Filed: Sep. 2, 2005

Related U.S. Application Data (60) Provisional application No. 60/606,869, filed on Sep. 2, 2004.

(51) Int. Cl.
*G11B 5/66* (2006.01)
(52) U.S. Cl. .................................. 428/828.1
(58) Field of Classification Search .......... 428/800–846
See application file for complete search history.

(56) References Cited

U.S. PATENT DOCUMENTS

| | | | |
|---|---|---|---|
| 4,423,450 A | 12/1983 | Hamilton | 360/111 |
| 4,656,546 A | 4/1987 | Mallory | 360/110 |
| 4,748,525 A | 5/1988 | Perlov | 360/110 |
| 5,815,342 A * | 9/1998 | Akiyama et al. | 360/97.01 |
| 7,101,600 B1 * | 9/2006 | Kim | 428/826 |
| 2001/0038932 A1 | 11/2001 | Uwazumi et al. | 428/694 |
| 2002/0028357 A1 | 3/2002 | Shukh et al. | 428/694 |
| 2002/0136930 A1 | 9/2002 | Oikawa et al. | 428/694 |
| 2003/0022023 A1 | 1/2003 | Carcy et al. | 428/694 |
| 2003/0091798 A1 * | 5/2003 | Zheng et al. | 428/195 |

OTHER PUBLICATIONS

Zheng et al.; Recording Characteristics of Perpendicular Magnetic Media with CoZrNb, NiFeNb, and Exchange-Pinned NiFeNb Soft Magnetic Underlayers; Journal of Applied Physics; May 15, 2003; vol. 93, No. 10, pp. 6763-6765.

* cited by examiner

*Primary Examiner*—Holly Rickman
*Assistant Examiner*—Lisa Chau
(74) *Attorney, Agent, or Firm*—Shumaker & Sieffert, P.A.

(57) ABSTRACT

A magnetic recording medium and a magnetic recording apparatus for perpendicular magnetic recording. The recording medium includes a magnetically soft underlayer and a hard magnetic pinning layer having perpendicular anisotropy. The magnetically soft underlayer is substantially free of domain walls.

32 Claims, 11 Drawing Sheets

PERPENDICULAR MAGNETIC RECORDING MEDIUM WITH A PINNED SOFT UNDERLAYER

CROSS-REFERENCE TO RELATED APPLICATIONS

This patent application claims priority under 35 U.S.C. §119(e) from U.S. Provisional Patent Application Ser. No. 60/606,869 entitled "PERPENDICULAR MAGNETIC RECORDING MEDIUM WITH PINNED SUL," filed on Sep. 2, 2004, the entire disclosure of which is incorporated herein by reference in its entirety.

BACKGROUND OF THE INVENTION

1. Field of the Invention

The present invention relates to magnetic recording media. In particular, the present invention relates to perpendicular magnetic recording media having a magnetically soft underlayer and a hard magnetic recording layer that is disposed over the soft underlayer.

2. Description of Related Art

Thin film magnetic recording media are composed of multiple layers, including one or more magnetic recording layers, disposed on a substrate. Typically, the magnetic recording layer includes small magnetic grains that have an easy magnetization axis that is magnetically oriented longitudinally (i.e., in plane) with respect to the magnetic layer.

The areal density of such longitudinal magnetic recording media has been increasing at a compounded growth rate of about 60% per year and areal densities as high as 100 gigabits per square inch (Gbit/in$^2$) have been demonstrated. Scaling longitudinal recording media to higher areal densities requires smaller magnetic grains. However, as the grain size is reduced, thermal fluctuations can cause the magnetic domains to "flip", resulting in a loss of magnetization over a period of time. Media having a higher magnetic coercivity ($H_c$) and an increased track density (tracks per inch, or TPI) can mitigate this problem. However, the large write head fields that are needed for good overwrite of high coercivity media can lead to excessive fringing, negatively affecting the data written on adjacent tracks.

Perpendicular (i.e., vertical) magnetic recording media have been proposed as a way to increase areal densities beyond 100 Gbit/in$^2$. Perpendicular magnetic recording media include a magnetic recording layer having an easy magnetization axis that is oriented substantially perpendicular to the magnetic layer. A perpendicular write-head, such as a monopole write-head or a shielded pole write-head is utilized to magnetize the grains in the perpendicular recording layer.

More specifically, the write-head for perpendicular recording media includes a write pole and a return pole that is magnetically coupled to the write pole. An electrically conductive magnetizing coil surrounds the yoke of the write pole and is adapted to switch the polarity of the magnetic field applied to the write pole. During operation, the recording head flies above the magnetic recording medium by a distance referred to as the fly height, and an electrical current is passed through the coil to create a magnetic flux within the write pole. The magnetic flux passes from the write pole tip through the magnetic recording layer and into a magnetically soft underlayer (SUL) disposed beneath the magnetic recording layer. The SUL causes the magnetic flux to pass across to the return pole of the write-head. In addition, the SUL produces magnetic charge images during read operations, increasing the magnetic flux and the playback signal. Examples of such perpendicular magnetic recording heads and associated perpendicular recording media are disclosed in: U.S. Pat. No. 4,423,450 by Hamilton; U.S. Pat. No. 4,656,546 by Mallary; and U.S. Pat. No. 4,748,525 by Perlov. Each of these U.S. patents is incorporated herein by reference in its entirety. Perpendicular recording media can support higher areal densities than conventional longitudinal media, in part due to reduced demagnetizing fields in the recording transitions (i.e., the transition from one magnetic bit to the next).

Figure 1:
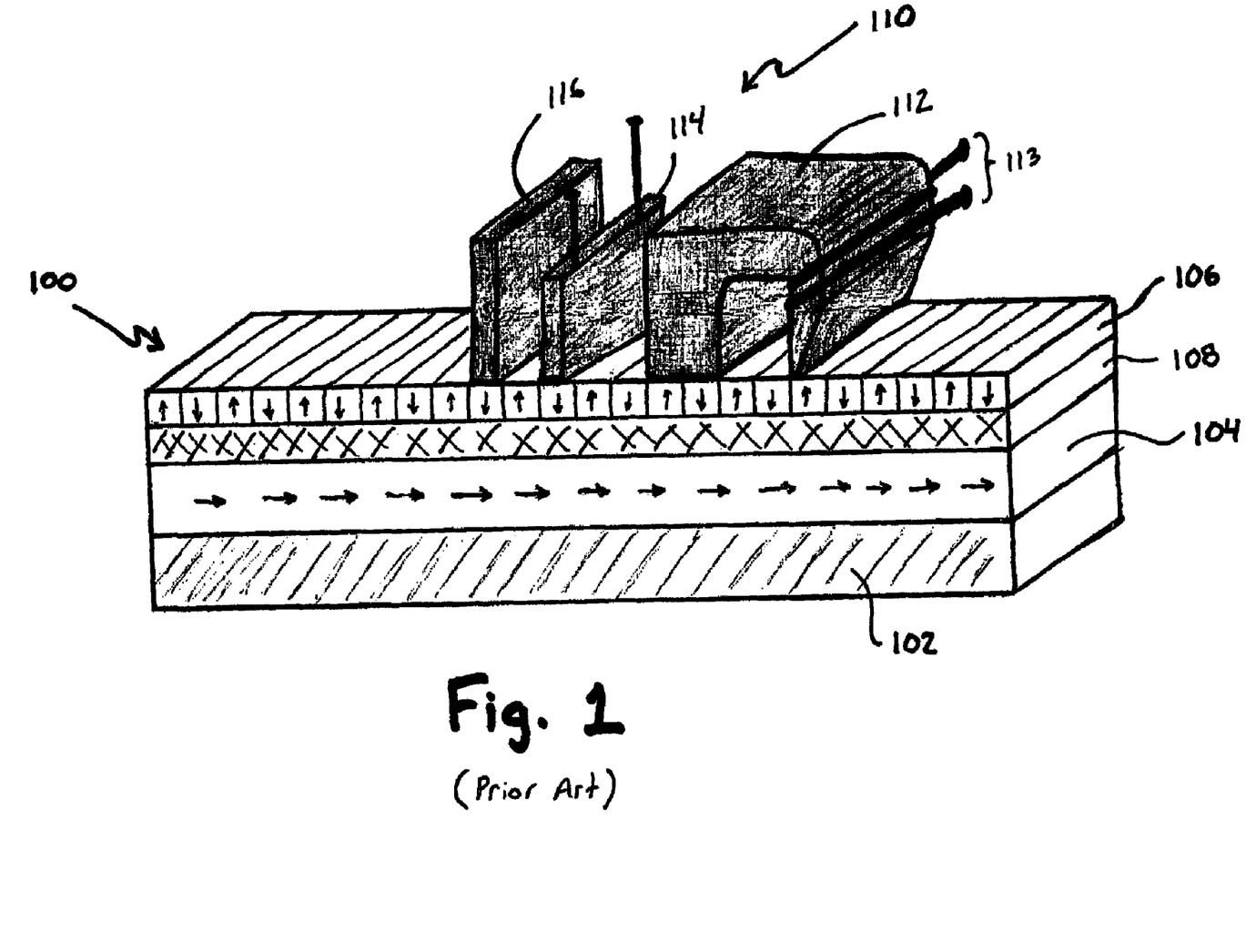
FIG. 1 illustrates a schematic diagram of a perpendicular recording medium and associated read-write head.

One design for magnetic media incorporating a perpendicular magnetic recording layer is illustrated in FIG. 1. Disposed above the perpendicular magnetic recording media 100 is a read-write head 110, which in operation flies above the perpendicular magnetic recording layer 106. The read-write head 110 includes a write element 112 having a magnetic coil 113 for applying electrical current to the write element 112. The read-write head 110 also includes a reading element 114 and a read shield 116 for reading data from the perpendicular magnetic recording media.

The recording media 100 includes two magnetic layers disposed on a substrate 102. The first layer is a relatively thick SUL 104 that serves as a return path for the magnetic field generated by the write element 112. The SUL 104 is typically about 200 nm thick, but can be thinner with accompanying changes in the read-write head design. The SUL 104 increases the write field and provides the added benefit of increasing the signal strength by imaging the perpendicular magnetic recording layer 106. The SUL is magnetically soft and the magnetic permeability of the SUL 104 should be at least about 100 to enable the large write fields that are necessary to write on the high coercivity perpendicular magnetic recording layer 106. It is generally preferred to have the anisotropy of the SUL 104 directed along the radial (cross-track) direction, although it can alternatively be along the circumferential (down-track) direction. The perpendicular magnetic recording layer 106 is a magnetically hard layer that has high coercivity, a negative nucleation field and perpendicular anisotropy. The magnetic recording media 100 can also include a non-magnetic spacer layer 108 between the two magnetic layers.

Many magnetic alloy systems have been utilized for the perpendicular magnetic recording layer 106, including the CoCrPt alloys that are traditionally used in longitudinal media, CoPt or CoPd multilayers, and rare-earth and transition metal alloys that are traditionally employed in magneto-optic drives. The most successful alloy system with respect to perpendicular recording performance has been the CoCrPt-oxide system. High coercivity, a squareness=1, negative nucleation, small grains, and magnetic isolation can all be simultaneously achieved using this oxide-containing alloy. A Ru intermediate layer and a Ta seed layer can also be used, resulting in media with good thermal stability and excellent recording performance. See, for example, U.S. Patent Publication No. 2003/0091798 by Zheng et al., which is incorporated herein by reference in its entirety.

One factor that is impeding the implementation of perpendicular recording media is the media noise resulting from the SUL. The noise can be due to fields generated at the magnetic domain walls (spike noise) or can be due to magnetic charges arising from external fields that are sensed by the read head. Since the domain walls can move after repeated writing operations, the noise sources are not fixed on the disk surface. Therefore, the distribution of magnetic domains within the SUL must be carefully controlled.

To eliminate domain walls and their associated spike noise, a layered SUL can be utilized. For example, layers of the magnetic alloys CoZrTa or FeTaC having a thickness of from about 30 nm to about 40 nm can be interleaved with layers of C or Ta having a thickness of about 1 nm to about 2 nm. However, the layered SUL will have a reduced magnetic permeability. Further, for a total SUL thickness above about 100 nm, the layered SUL requires additional process steps, which increases manufacturing costs.

Modifications to the SUL have been proposed to improve the magnetic properties of the media. For example, U.S. Patent Application Publication No. 2002/0028357 by Shukh et al. discloses a perpendicular magnetic recording medium with anti-ferromagnetic coupling in the SUL. The SUL is a laminated structure that includes first and second soft magnetic layers; first and second interface layers and a non-magnetic coupling layer between the first interface layer and the second interface layer. The soft magnetic layers and the interface layers are both anti-ferromagnetically exchange coupled to one another through the non-magnetic coupling layer such that their magnetizations are oriented anti-parallel to one another. It is disclosed that exchange anti-ferromagnetic coupling forms a strong in-plane bias field that maintains the ferromagnetic coupled layers in a mostly single domain state.

U.S. Patent Application Publication No. 2003/0022023 by Carey et al. discloses dual-layered perpendicular magnetic recording media. The magnetic recording media includes a laminated SUL structure that has at least two ferromagnetic film layers that are exchange-coupled across an anti-ferromagnetic coupling layer. The magnetic moments of the ferromagnetic film layers are oriented anti-parallel.

Multi-domains in the SUL can also be suppressed by applying an in-plane (longitudinal) bias field during fabrication. For example, the SUL can be magnetically "pinned" by an anti-ferromagnetic layer with in-plane (longitudinal) anisotropy that is disposed beneath the SUL, as is disclosed in U.S. Patent Application Publication No. 2001/0038932 by Uwazumi. The SUL can also be pinned by a hard magnetic layer with in-plane anisotropy, as is disclosed in U.S. Patent Application Publication No. 2002/0136930 by Oikawa et al. According to Oikawa et al., the bias field increases the effective anisotropy field of the SUL. However, the bias field also leads to increased coercivity of the SUL.

The use of anti-ferromagnetic materials usually requires a high temperature annealing step in the presence of a magnetic field to set the anisotropy along a particular direction, or requires a magnet array fitted to a sputtering unit that produces a complex radial field pattern. For both cases, setting the bias field requires a special magnet or electromagnet arrangement, which increases cost and reduces throughput. For permanent magnet pinning, the fields required to set the magnetization direction can also be very large, adding to the difficulty of longitudinal bias. Moreover, for presently known magnetic systems, the anisotropy direction cannot be fabricated along the radial direction, but is random in the plane. To some extent, the anisotropy direction can be aligned along the circumferential direction, but cannot be completely aligned.

There is a need for a perpendicular recording medium where the foregoing limitations and disadvantages are reduced or eliminated.

SUMMARY OF THE INVENTION

The present invention is directed to a perpendicular recording medium that includes a magnetic recording layer and a magnetically soft underlayer (SUL), where the SUL is magnetically pinned by a magnetic pinning layer having perpendicular magnetic anisotropy. Bulk magnetization of the pinning layer can advantageously form a SUL that is substantially free of domain walls.

According to one embodiment of the present invention, a magnetic recording medium is provided. The medium includes a substrate, a magnetically hard recording layer having perpendicular magnetic anisotropy disposed over the substrate, a magnetically soft underlayer disposed between the magnetically hard recording layer and the substrate, and a magnetic pinning layer disposed between the substrate and the soft magnetic underlayer where the magnetic pinning layer has perpendicular magnetic anisotropy. Preferably, the magnetic pinning layer is physically coupled with the magnetically soft underlayer.

According to one aspect of this embodiment, the magnetically soft underlayer is substantially free of domain walls. According to another aspect, the magnetically soft underlayer has a magnetic coercivity ($H_c$) of not greater than about 30 Oe. According to yet another aspect, the magnetically soft underlayer has a magnetic permeability of at least about 100.

According to one aspect of the present invention, a magnetic pinning layer is part of a pinning layer structure, where the pinning layer structure includes first and second magnetic pinning layers that are anti-ferromagnetically coupled through a non-magnetic spacer layer disposed between the two magnetic pinning layers. According to another aspect, the soft magnetic underlayer is part of a soft underlayer structure, wherein the soft underlayer structure includes a first soft underlayer and a second soft underlayer and a non-magnetic spacer layer separating the first and second soft underlayers.

According to another embodiment of the present invention, a magnetic recording medium is provided that includes a substrate, a magnetically hard recording layer having perpendicular magnetic anisotropy disposed over the substrate, a magnetically soft underlayer disposed over the substrate, a magnetically soft underlayer disposed between the magnetically hard recording layer and the substrate where the magnetically soft underlayer has a magnetic permeability of at least about 100 and is substantially free of domain walls, and a magnetic pinning layer disposed between the substrate and the soft magnetic underlayer. Preferably, the magnetic pinning layer comprises a ferrimagnetic material and has a perpendicular magnetic anisotropy.

DESCRIPTION OF THE INVENTION

The present invention is directed to a magnetic recording medium that includes a perpendicular magnetic recording layer. As used herein, a perpendicular magnetic layer is a magnetic layer having perpendicular anisotropy, where the magnetic grains have an easy magnetization axis that is oriented substantially perpendicular to the planar surface of the layer. According to the present invention, the magnetic recording medium includes a perpendicular magnetic recording layer, and a perpendicular magnetic pinning layer that is adapted to pin a SUL disposed over the pinning layer.

Figure 2:
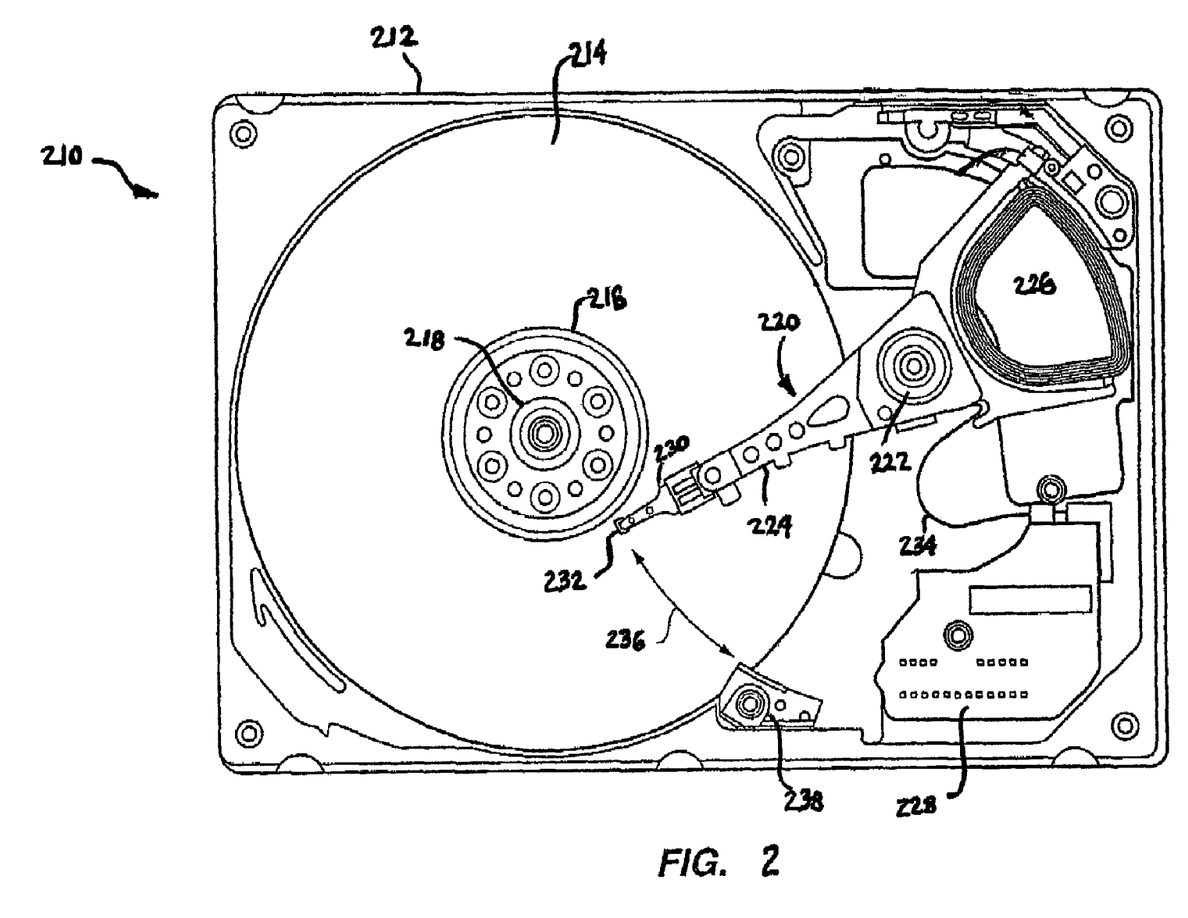
FIG. 2 illustrates a disk drive device that can utilize a perpendicular recording medium according to the present invention.

The magnetic recording medium can be, for example, a magnetic tape or magnetic hard disk, and in a preferred embodiment is a magnetic hard disk, such as for use in a disk drive. FIG. 2 illustrates one embodiment of a disk drive 210. The disk drive 210 generally includes a base plate 212 and a cover (not shown) that may be disposed on the base plate 212 to define an enclosed housing or space for the various disk drive components. The disk drive 210 includes one or more data storage disks 214, such as the magnetic recording medium according to the present invention. Typically, both of the major surfaces of each data storage disk 214 include a plurality of concentrically disposed tracks for data storage purposes. Each disk 214 is mounted on a hub or spindle 216, which in turn is rotatably interconnected with the disk drive base plate 212 and/or cover. Multiple data storage disks 214 are typically mounted in vertically spaced and parallel relation on the spindle 216. Rotation of the disk(s) 214 is provided by a spindle motor 218 that is coupled to the spindle 216 to simultaneously spin the data storage disk(s) 214 at an appropriate rate.

The disk drive 210 also includes an actuator arm assembly 220 that pivots about a pivot bearing 222, which in turn is rotatably supported by the base plate 212 and/or cover. The actuator arm assembly 220 includes one or more individual rigid actuator arms 224 that extend out from near the pivot bearing 222. Multiple actuator arms 224 are typically disposed in vertically spaced relation, with one actuator arm 224 being provided for each major data storage surface of each data storage disk 214 of the disk drive 210. Other types of actuator arm assembly configurations could be utilized as well, such as an "E" block having one or more rigid actuator arm tips or the like that cantilever from a common structure. In any case, movement of the actuator arm assembly 220 is provided by an actuator arm drive assembly, such as a voice coil motor 226 or the like. The voice coil motor 226 is a magnetic assembly that controls the operation of the actuator arm assembly 220 under the direction of control electronics 228. Any appropriate actuator arm assembly drive type may be utilized by the disk drive 210, including a linear drive (for the case where the actuator arm assembly 220 is interconnected with the base plate 212 and/or cover for linear movement versus the illustrated pivoting movement about the pivot bearing 222) and other types of rotational drives.

A load beam or suspension 230 is attached to the free end of each actuator arm 224 and cantilevers therefrom. Typically, the suspension 230 is biased generally toward its corresponding disk 214 by a spring-like force. A slider 232 is disposed at or near the free end of each suspension 230. What is commonly referred to as the read/write head (e.g., transducer) is appropriately mounted on the slider 232 and is used in disk drive read/write operations.

The head on the slider 232 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in on-wafer resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by an insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The read/write head of the present invention is discussed in further detail below.

The biasing forces exerted by the suspension 230 on its corresponding slider 232 moves the slider 232 in the direction of its corresponding disk 214. Typically, this biasing force is such that if the slider 232 were positioned over its corresponding disk 214, without the disk 214 being rotated at a sufficient velocity, the slider 232 would be in contact with the disk 214.

The head on the slider 232 is connected to a preamplifier 233, which is interconnected with the control electronics 228 of the disk drive 210 by a flex cable 234 that is typically mounted on the actuator arm assembly 220. Signals are exchanged between the head and its corresponding data storage disk 214 for disk drive read/write operations. In this regard, the voice coil motor 226 is utilized to pivot the actuator arm assembly 220 to simultaneously move the slider 232 along a path 236 and "across" the corresponding data storage disk 214 to position the head at the desired/required radial position on the disk 214 (i.e., at the approximate location of the correct track on the data storage disk 214) for disk drive read/write operations.

When the disk drive 210 is not in operation, the actuator arm assembly 220 is pivoted to a "parked position" to dispose each slider 232 generally at or beyond a perimeter of its corresponding data storage disk 214, but in any case in vertically spaced relation to its corresponding disk 214. This is commonly referred to in the art as being a dynamic load/ unload disk drive configuration. In this regard, the disk drive 210 includes a ramp assembly 238 that is disposed beyond a perimeter of the data storage disk 214 to typically both move the corresponding slider 232 vertically away from its corresponding data storage disk 214 and to also exert somewhat of a retaining force on the actuator arm assembly 220. Any configuration for the ramp assembly 238 that provides the desired "parking" function may be utilized. The disk drive 210 could also be configured to be of the contact start/stop type, where the actuator arm assembly 220 would pivot in a direction to dispose the slider(s) 232 typically toward an inner, non-data storage region of the corresponding data storage disk 214. Terminating the rotation of the data storage disk(s) 214 in this type of disk drive configuration would then result in the slider(s) 232 actually establishing contact with or "landing" on its corresponding data storage disk 214, and the slider 232 would remain on the disk 214 until disk drive operations are re-initiated.

The slider 232 of the disk drive 210 may be configured to "fly" on an air bearing during rotation of its corresponding data storage disk(s) 214 at a sufficient velocity. The slider 232 may be disposed at a pitch angle such that its leading edge is disposed further from its corresponding data storage disk 214 than its trailing edge. The read/write head would typically be incorporated on the slider 232 generally toward its trailing edge since this is positioned closest to its corresponding disk 214. Other pitch angles/orientations could also be utilized for flying the slider 232.

The disk 214 includes a magnetic recording layer structure disposed on one or both of the major surfaces of the disk 214. The magnetic recording layer is typically composed of various thin film functional layers disposed on a substrate. A number of magnetic properties are critical to achieving high areal density so that the overall size of the disk drive device can be reduced, or so that the overall capacity of the disk drive device can be increased.

The present invention is directed to perpendicular recording media, such as one that is useful in a disk drive device as illustrated in FIG. 2. The perpendicular recording media includes a perpendicular magnetic recording layer and a SUL disposed beneath the magnetic recording layer. According to the present invention, a magnetic pinning layer having perpendicular anisotropy is disposed between a substrate and the SUL. As a result, the SUL preferably has no domain walls and results in improved magnetic recording performance.

Figure 3:
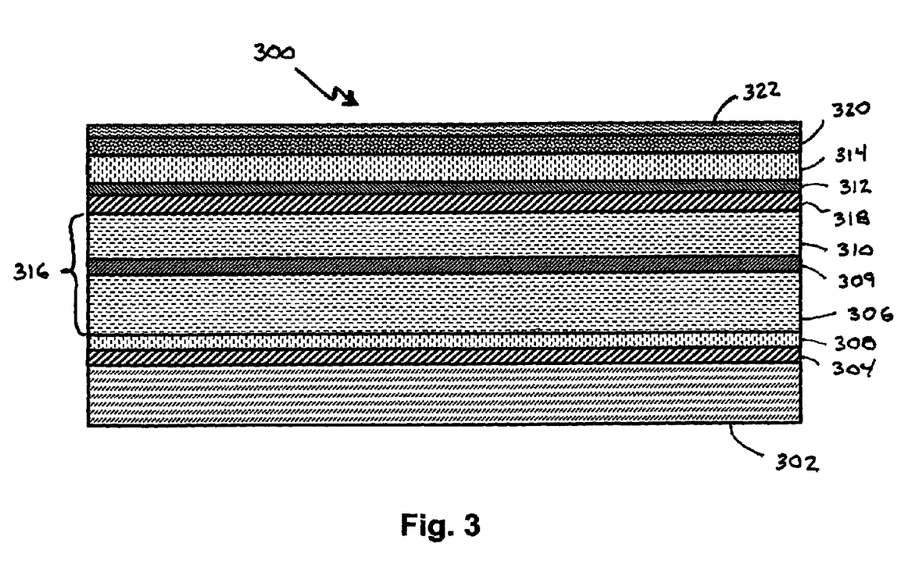
FIG. 3 illustrates a schematic diagram of a perpendicular recording medium according to an embodiment of the present invention.

FIG. 3 illustrates a cross-sectional view of a perpendicular magnetic recording medium according to one embodiment of the present invention. The magnetic recording medium 300 includes multiple layers that are deposited upon a substrate 302. Among the layers disposed on the substrate 302 is a perpendicular magnetic recording layer 314. Disposed between the substrate 302 and the perpendicular magnetic recording layer 314 is a SUL structure 316. Disposed between the SUL structure 316 and the substrate 302 is a perpendicular magnetic pinning layer 308 that is adapted to pin the domains in the magnetic layers 306 and 310 of the SUL structure 316. It will be appreciated by those skilled in the art that the magnetic recording medium can include a magnetic recording layer structure on both sides of the substrate 302.

The substrate 302 can be fabricated from a number of materials known to those skilled in the art to be useful for magnetic recording media such as hard disks. A particularly preferred material for a substrate 302 according to the present invention is aluminum (Al) coated with a layer of nickel phosphorous (NiP). However, it will be appreciated that a substrate can also be fabricated from other materials, such as glass and glass-containing materials, including glass-ceramics. The substrate 302 typically has an average thickness in the range of from about 10 mils to about 75 mils (about 0.254 millimeter to 1.9 millimeter) and has a smooth surface upon which the remaining layers can be deposited.

The magnetic recording media 300 includes a perpendicular recording layer 314 and an SUL structure 316 that are required for use with a perpendicular read-write head (See FIG. 1). According to the present invention, a magnetically hard pinning layer 308 is disposed between the substrate 302 and a first magnetically soft layer 306 of the SUL structure 316. The pinning layer 308 has a perpendicular anisotropy and preferably has an anisotropy field ($H_k$) that is approximately equal to the anisotropy field of the magnetic recording layer 314. The anisotropy field in the pinning layer 308 is preferably high enough such that the fields coming from a monopole or shielded pole read-write head do not reverse the anisotropy field. The pinning layer 308 is preferably in direct contact (coupled) with the first magnetically soft layer 306 of the SUL structure 316.

The pinning layer 308 can comprise ferromagnetic alloys, such as alloys of cobalt (Co) or iron (Fe). Preferably, the pinning layer 308 includes a ferrimagnetic alloy. Particularly preferred among Fe-containing ferrimagnetic alloys are FePt. Particularly preferred among Co-containing ferrimagnetic alloys are those including chromium (Cr) and/or platinum (Pt), such as CoCr, CoCrTa, CoPt, CoCrPt and CoCrPt-oxide. The remanent magnetization thickness product ($M_r$t) can be reduced to reduce fringing fields at the read element by, for example, alloying with Cr or increasing the Cr content or by alloying with a transition metal. A rare earth metal can also be utilized in the alloy, such as Gd, Tb or Dy. Accordingly, the thickness of the pinning layer 308 is preferably at least about 5 nanometers and more preferably is at least about 15 nanometers in thickness. Further, the thickness is preferably not greater than about 40 nanometers and more preferably is not greater than about 25 nanometers. The resulting $M_r$T value is preferably at least about 0.3 memu/cm$^2$ and not greater than about 1.0 memu/cm$^2$, more preferably not greater than about 0.7 memu/cm$^2$.

A first seedlayer 304 can advantageously be disposed between the substrate 302 and the pinning layer 308 and preferably is physically coupled to (i.e., in direct contact with) the pinning layer 308. The seedlayer 304 can be fabricated from materials such as Cr, MgO, Mo, Nb, NiTa, Ru, $Si_3N_4$, Ta, Ti, W, and alloys thereof, and in a preferred embodiment is fabricated from Cr or Ru. The seedlayer preferably has a thickness of at least about 10 nanometers and preferably not greater than about 30 nanometers.

The SUL structure 316 can be a single layer of a soft magnetic material or, as illustrated in FIG. 3, can include multiple magnetically soft layers 306, 310 laminated with a non-magnetic spacer layer 309. The non-magnetic spacer layer 309 can be made of any non-magnetic element or alloy such as ruthenium (Ru), rhenium (Re), rhodium (Rh), chromium (Cr) or copper (Cu) and preferably is consists essentially of Ru. The thickness of the non-magnetic spacer layer 309 is selected to induce negative coupling between the first soft layer 306 and the second soft layer 310. According to one embodiment, the thickness of the non-magnetic spacer layer 309 can be from about 0.5 nanometers to about 1.0 nanometer, such as about 0.7 nanometers.

The soft underlayer structure 316 comprises a magnetically soft layer 306 and a second magnetically soft layer 310. The soft magnetic layers 306 and 310 have a high permeability and a low coercivity. Preferably, the soft magnetic layers have a coercivity of not greater than about 30 oersteds (Oe) and a magnetic permeability of at least about 100. For example, the soft magnetic underlayers can be fabricated from soft magnetic materials such as CoZrNb, CoZrTa, FeCoB, NiFe, NiFeNb, NiFeMo, FeAlSi and FeTaC. It will be appreciated that the soft underlayers 306 and 310 can be fabricated from the same soft magnetic material, or from different soft magnetic materials. The total thickness of the magnetically soft underlayer structure is preferably at least about 50 nanometers, more preferably at least about 75 nanometers. Preferably, the thickness is not greater than about 300 nanometers and more preferably is not greater than about 200 nanometers. According to the present invention, the magnetically soft underlayers are substantially free of domain walls, as can be determined by Optical Surface Analysis.

A second seed layer 318 can be disposed between the SUL structure 316 and the magnetic recording layer 314 to aid in the alignment of the perpendicular anisotropy of the magnetic recording layer 314. The second seed layer 318 preferably has a thickness of at least about 1 nanometer and preferably not greater than about 10 nanometers and is a non-magnetic element or alloy, such as Ta or alloys thereof. Further, the second seed layer 318 preferably has an amorphous structure. An intermediate layer 312 can also be provided and is preferably made of Ru or another material having a hexagonal close packed (hcp) structure. The intermediate layer 312 preferably has a thickness of at least about 3 nanometers and not greater than about 50 nanometers. The intermediate layer 312 is adapted to enhance the crystal growth in the magnetic recording layer 314 and the second seed layer 318 is adapted to enhance the <0001> crystal growth in the intermediate layer 312.

The magnetic recording layer 314 has an easy magnetization axis (e.g., the C-axis) that is oriented perpendicular to the surface of the magnetic recording layer 314. Useful materials for the magnetic recording layer 314 include Co-containing alloys having a hexagonal close packed (hcp) structure and certain Fe alloys such as FePt. Co can be alloyed with elements such as chromium (Cr), platinum (Pt), palladium (Pd), boron (B), niobium (Nb), tungsten (W) and tantalum (Ta). In one preferred embodiment, the magnetic recording layer 314 includes cobalt alloyed with chromium (CoCr). As used herein, the term CoCr alloys can include alloys having other components in addition to Co and Cr. For example, a CoCr alloy can also include platinum (CoCrPt) and the CoCrPt alloy can include other elements such as boron (CoCrPtB). In addition, the magnetic recording layer can comprise an oxide, such as a CoCrPt-oxide or a CoCrPtB-oxide. Such oxides can further include silicon (Si), such as a CoCrPtSi-oxide or a CoCrPtBSi-oxide. The magnetic recording layer 314 preferably has an average thickness of at least about 10 nanometers, such as at least about 15 nanometers, and preferably is not thicker than about 30 nanometers.

An overcoat layer 320, such as a carbon overcoat and a lubricant 322 can be disposed on the magnetic recording layer 314 to protect the recording layer during start stop operations and for tribology purposes.

Figure 4:
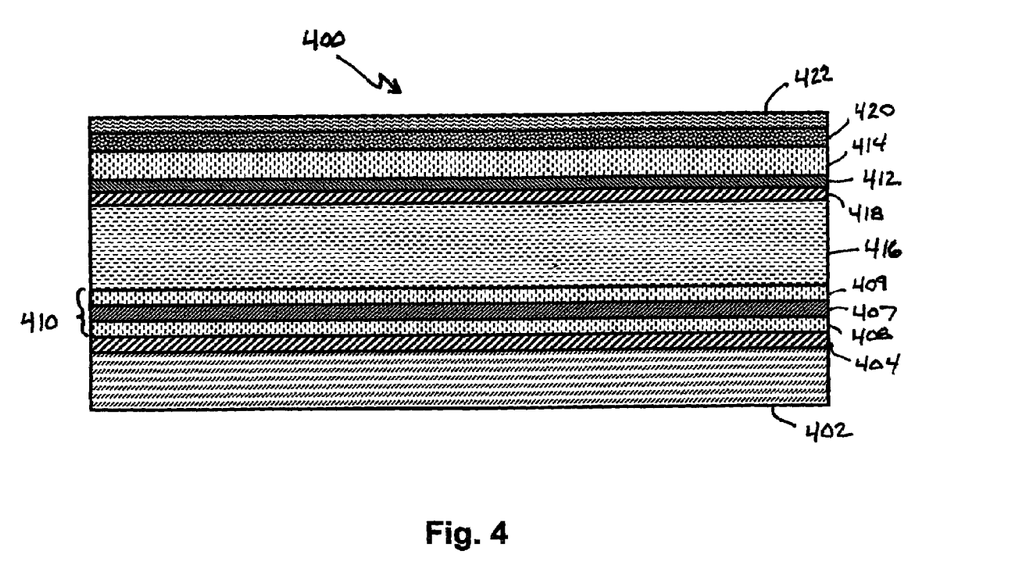
FIG. 4 illustrates a schematic diagram of a perpendicular recording medium according to an embodiment of the present invention.

FIG. 4 illustrates the structure of a perpendicular recording medium 400 according to another embodiment of the present invention. The perpendicular recording medium 400 includes a substrate 402, second seedlayer 418, intermediate layer 412, perpendicular magnetic recording layer 414, overcoat layer 420 and lubricant layer 422 substantially as described with respect to FIG. 3. As compared to the embodiment illustrated in FIG. 3, the structure of the magnetically hard pinning layer and the magnetically soft underlayer is different. The perpendicular magnetic recording medium 400 includes a single magnetically soft underlayer 416 that is biased by a laminated magnetically hard pinning structure 410 with perpendicular anisotropy and reduced effective $M_r t$. In the pinning structure 410, first and second perpendicular magnetic layers 408 and 409 are antiferromagnetically coupled through a non-magnetic spacer layer 407. The saturation magnetization ($M_s$) of each of the two magnetic layers 408 and 409 is preferably approximately the same to reduce the net $M_r t$ to about zero. The two magnetic layers 408 and 409 preferably each have a thickness of at least about 10 nanometers and preferably not greater than about 30 nanometers. The spacer layer 407 preferably has a thickness of at least about 0.5 nanometers and not greater than about 1.0 nanometers. The SUL 416 is pinned by contact with the second (top) pinning layer 409 and the fringing field from the magnetic pinning layers is significantly reduced resulting in a medium with a single-domain SUL 416 and reduced DC noise. For some rare-earth transition metal alloys, a zero net $M_r t$ can be achieved without the use of a non-magnetic spacer layer 407, i.e., with a single layer instead of the three illustrated in FIG. 4. The magnetic layers 408 and 409 are preferably ferrimagnetic and should have a high coercivity, such as at least about 4 kOe, and a relatively low $M_r T$, such as not greater than about 0.1 memu/cm$^2$, so that read operations are not significantly affected.

The layers of the magnetic recording media according to the present invention can be deposited on the substrate using known deposition techniques. For example, the deposition of the layers under the substrate can be accomplished by physical vapor deposition, e.g., sputtering. Sputtering can be accomplished using gases such as Ar, Kr or Xe. Oxygen can be included in the sputtering gas (reactive sputtering) to form an oxide phase for the magnetic layer (e.g., CoCrPt-oxide). For the magnetic pinning layers, the magnetic underlayers and the magnetic recording layer, it is preferred to sputter at a pressure of from about 2 mTorr to about 150 mTorr. The substrate can be heated prior to sputtering and can be annealed after one or more of the layers have been deposited to relieve residual stresses. The perpendicular magnetic pinning layer(s) can be set by an arrangement of permanent magnets or electromagnets to apply a field perpendicular to the layer, resulting in SUL domain walls being eliminated. Although the DC noise may be increased, moderate and high frequency recording performance (SNR and overwrite) is not adversely affected.

Figure 5:
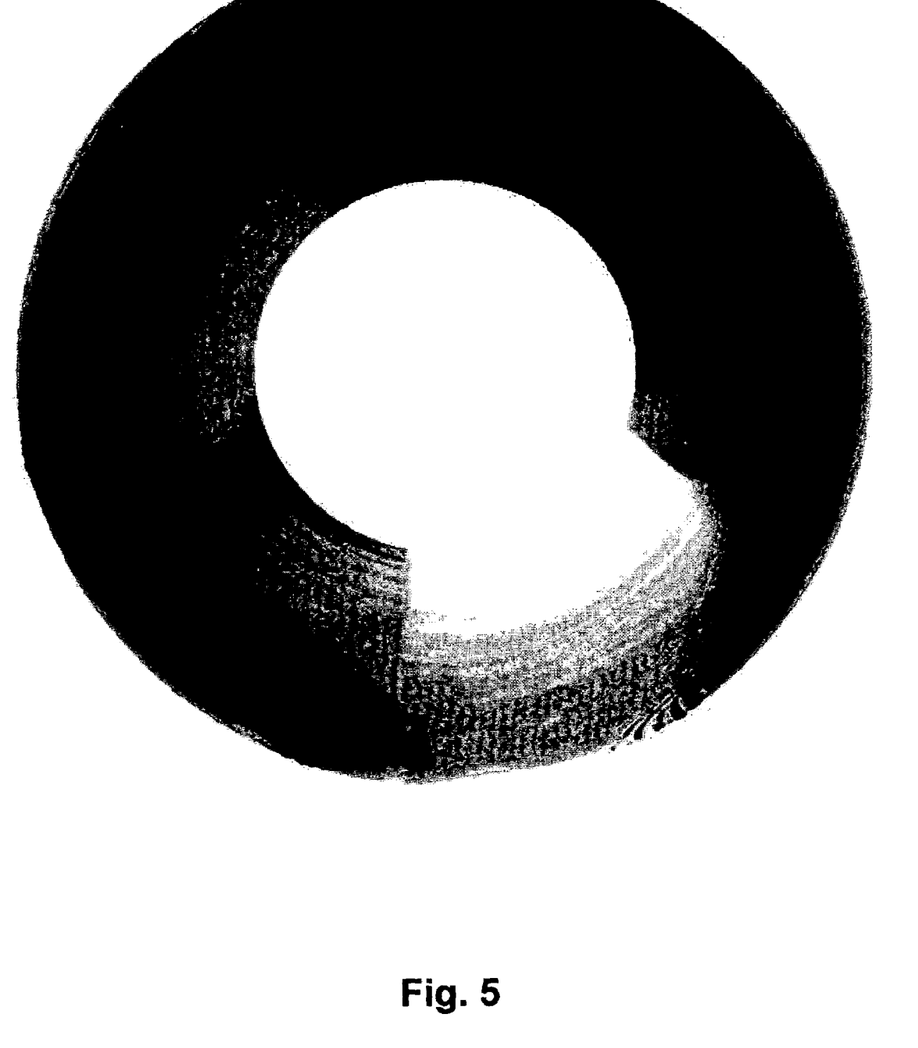
FIG. 5 illustrates an Optical Surface Analyzer (OSA) image of the domain patterns in a magnetically soft underlayer according to the prior art.

FIG. 5 illustrates an Optical Surface Analyzer (OSA) image of a magnetic disk having a single SUL with a thickness of greater than 100 nm. To assess the structure of the SUL, no further layers are deposited. Domain walls extending from the inner diameter (ID) to the outer diameter (OD) can be observed as well as triangular domains near the OD.

Figure 6:
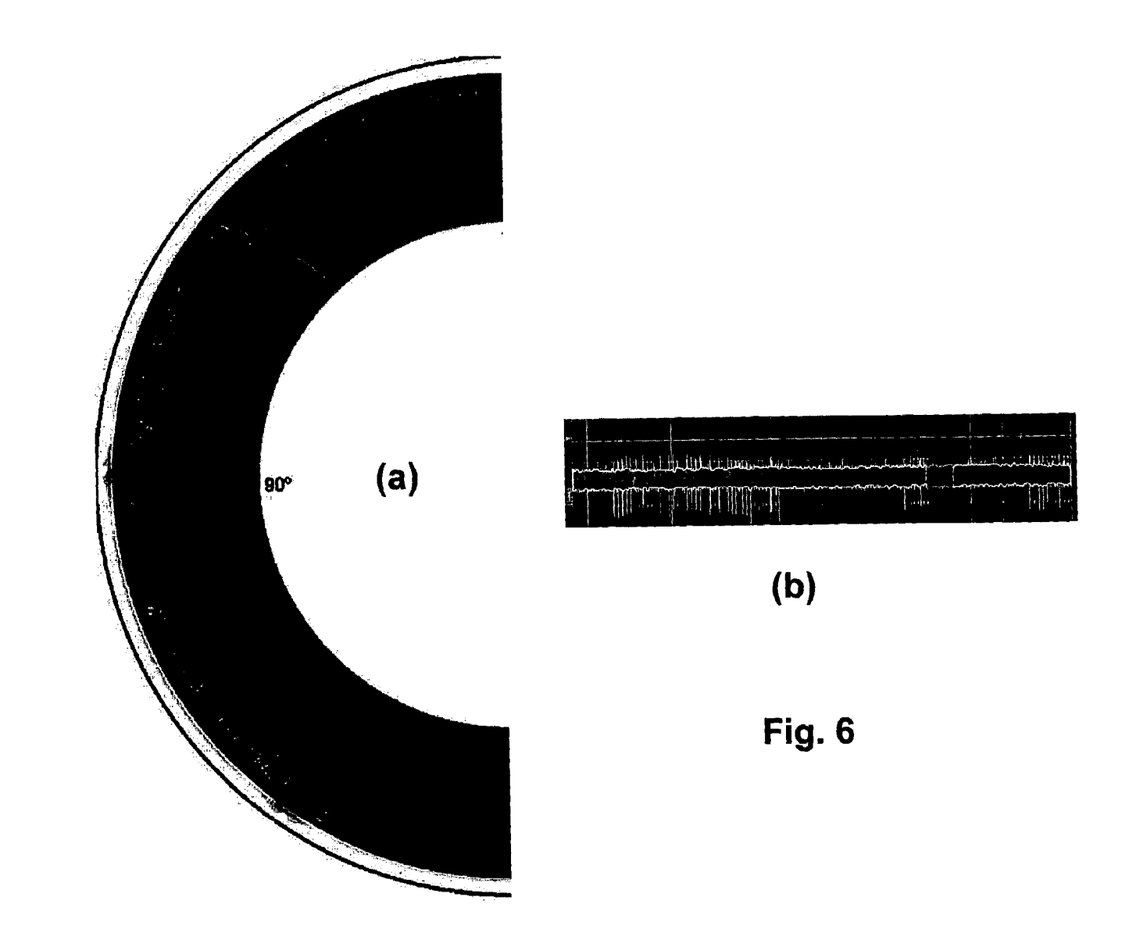
FIG. 6(a) illustrates an OSA image of the domain patterns in a magnetically soft underlayer.
FIG. 6(b) illustrates a one-revolution time-domain signal scan of one circumferential track of a soft underlayer.

FIG. 6(a) illustrates an OSA image of a laminated SUL structure having two magnetically soft layers separated by a 0.7 nanometer thick spacer layer of non-magnetic Ru, such that the two magnetically soft layers are anti-ferromagnetically coupled. The overall thickness of the SUL structure is about 100 nm. A magnetic pinning layer with perpendicular anisotropy is also formed on the substrate, but with a carbon spacer layer disposed between the magnetic pinning layer and the first magnetically soft layer (no recording layer is deposited). For this case, the biasing is not effective and finger-like magnetic domains can be readily observed near the disk OD. FIG. 6(b) illustrates a one revolution time-domain signal from an oscilloscope of a track near the OD. The reader response to the domain pattern can be observed as "spikes" over a large portion of the track. The finger-like pattern is observed to occur more for anti-ferromagnetically coupled soft underlayers, showing that negative coupling of the soft underlayers does not necessarily eliminate domain noise.

Figure 7:
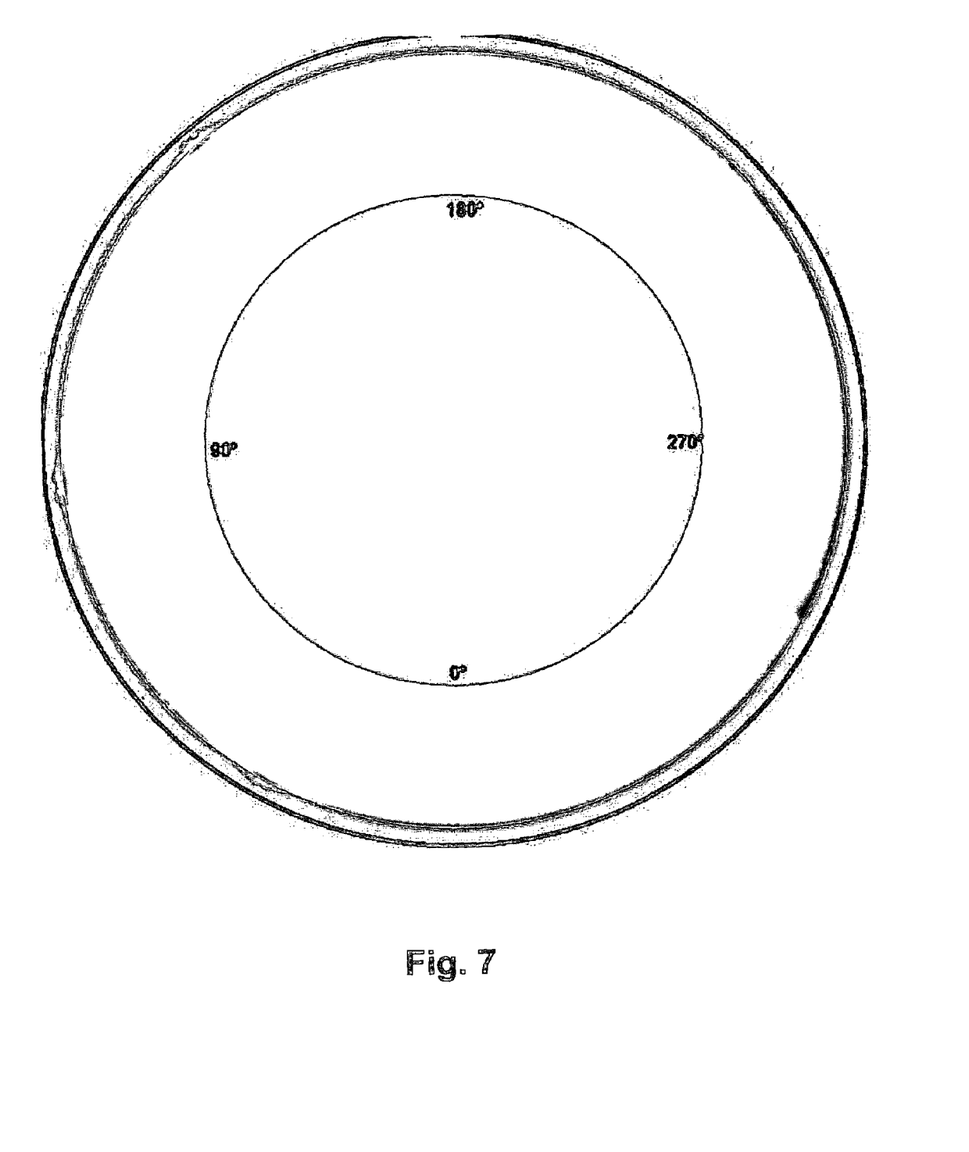
FIG. 7 illustrates an OSA image of a magnetically soft underlayer before magnetization of an underlying pinning layer.
Figure 8:
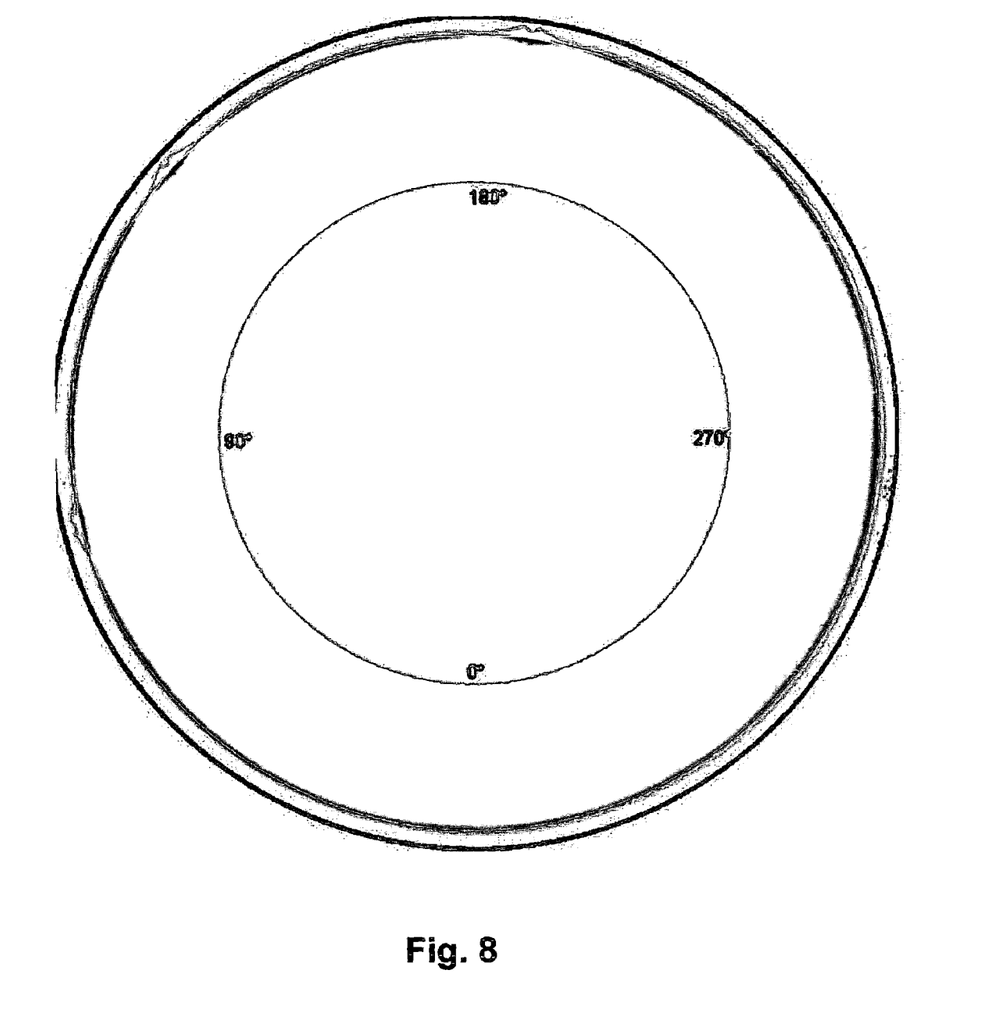
FIG. 8 illustrates an OSA image of a magnetically soft underlayer after magnetization of an underlying pinning layer.

FIG. 7 illustrates an OSA image of a two layer SUL structure, where the layers are anti-ferromagnetically coupled to each other and are pinned with a magnetic pinning layer, but with no carbon spacer. That is, the magnetic pinning layer and the first magnetically soft layer are physically coupled and magnetically exchange coupled. The as-deposited state of FIG. 7 shows domain walls extending over the radius but with no finger-like domains. FIG. 8 illustrates an OSA image of the same disk after application of a magnetic field (8 kOe) normal to the disk plane to impart perpendicular anisotropy to the magnetic pinning layer. It is evident that a "single-domain state" is obtained in the SUL.

Figure 9:
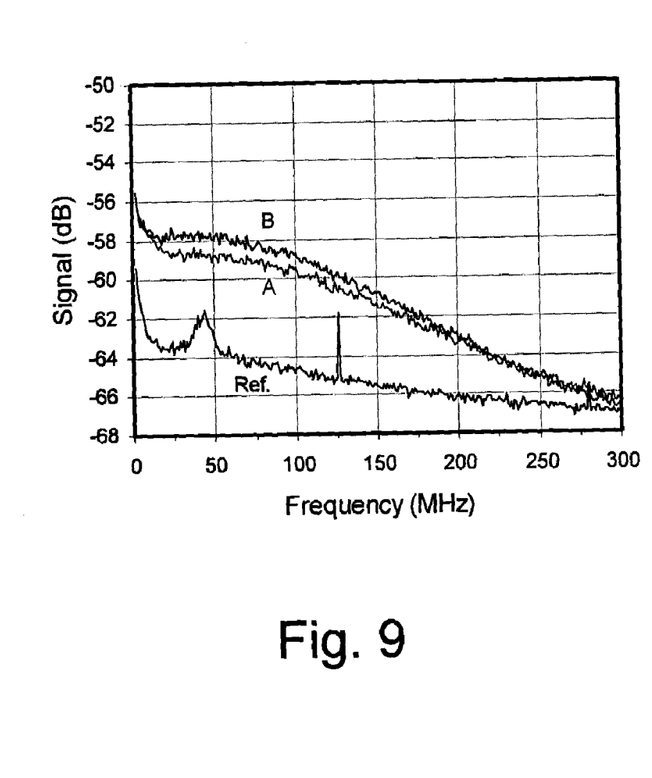
FIG. 9 illustrates the DC spectra of magnetic recording medium according to an embodiment of the present invention compared to a recording medium without a pinning layer.

FIG. 9 illustrates the DC noise spectra for perpendicular media with (A & B) and without (Ref) a perpendicular magnetic pinning layer. Two values of $M_rt$ are used for the magnetic pinning layer, with medium A having 30% lower $M_rt$ than medium B. Medium B shows the greatest DC noise followed by medium A. The reference medium shows the least DC noise. The origin of the peak near 40 MHz is uncertain but may arise due to the finger-like domains. The sharp peak near 125 MHz is due to inadequate erasure.

Although the overall DC noise is higher for media A and B, it is broadband and eliminating the negative coupling will result in reduced noise. The $M_rt$ of medium A is more than 0.4 memu/cm$^2$ and can be further reduced to decrease the fringing fields near the head. For example, ferrimagnet is materials such as TbFeCo, GdFeCo, and DyFeCo near their compensation points may be employed to reduce the stray field. They can be amorphous and still have large $H_k$, but the $H_c$ is very sensitive to the alloy composition. With tight compositional control, these alloys can be designed such that the coercivity is very large at the operating temperatures of the disk drive. To magnetize, the disks can be heated to moderate temperatures and a modest field applied. In principle, this can be done during the sputtering process where the disks are slightly heated anyway. As corrosion may be an issue for these rare-earth alloys, especially at the disk edges, means can be provided to reduce exposure to air. For example, deposition shields or masks can be employed such that very little deposition is made near the disk edges (ID and OD) resulting in a reduced thickness near the disk edges. Alloying with Cr has also been proven effective for reducing corrosion in magneto-optic media.

Figure 10:
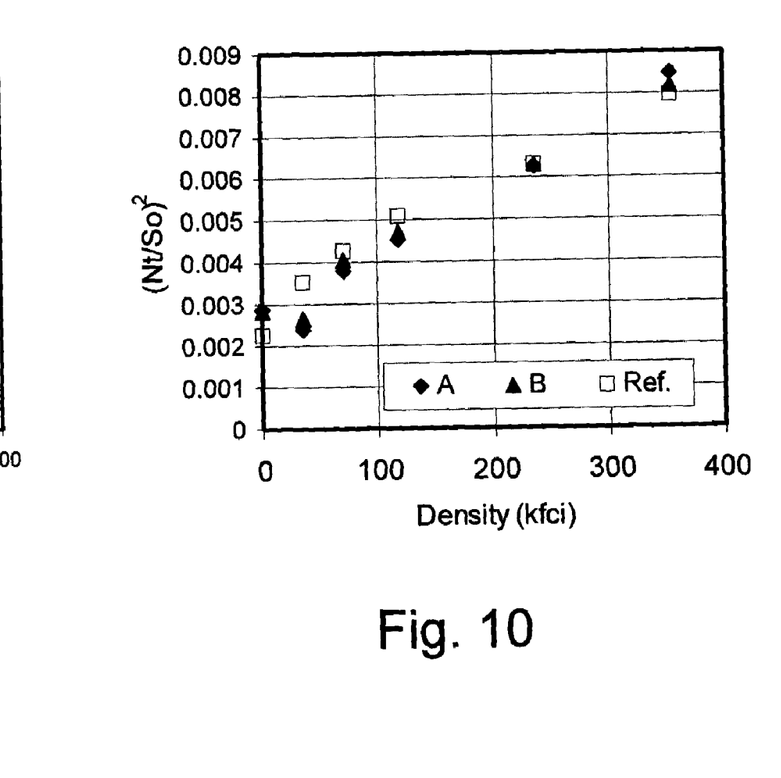
FIG. 10 illustrates total noise to isolated signal ratio with density for a recording medium according to an embodiment of the present invention compared to a recording medium without a pinning layer.

FIG. 10 illustrates the dependence of the square of the total noise to isolated signal ratio of the same media as is illustrated in FIG. 9 and measured with a similar head as a function of density. The reference medium has lower DC noise, but at lower densities they are similar. At around 40 kfci, the pinned media actually have better performance.

Figure 11:
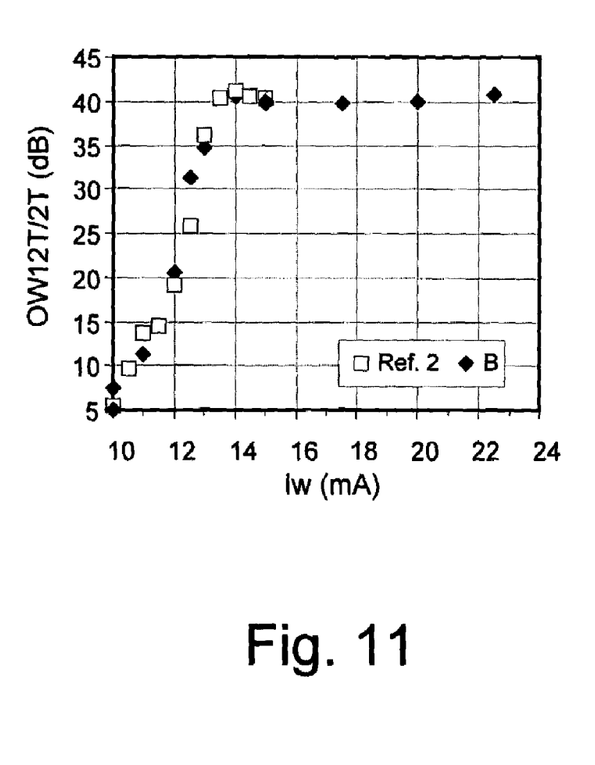
FIG. 11 illustrates the overwrite (OW) properties of a magnetic recording medium according to an embodiment of the present invention.

FIG. 11 illustrates the overwrite (OW) at various write currents for medium B and another reference medium. No difference is observed showing that the writing efficiency is not adversely affected.

Figure 12:
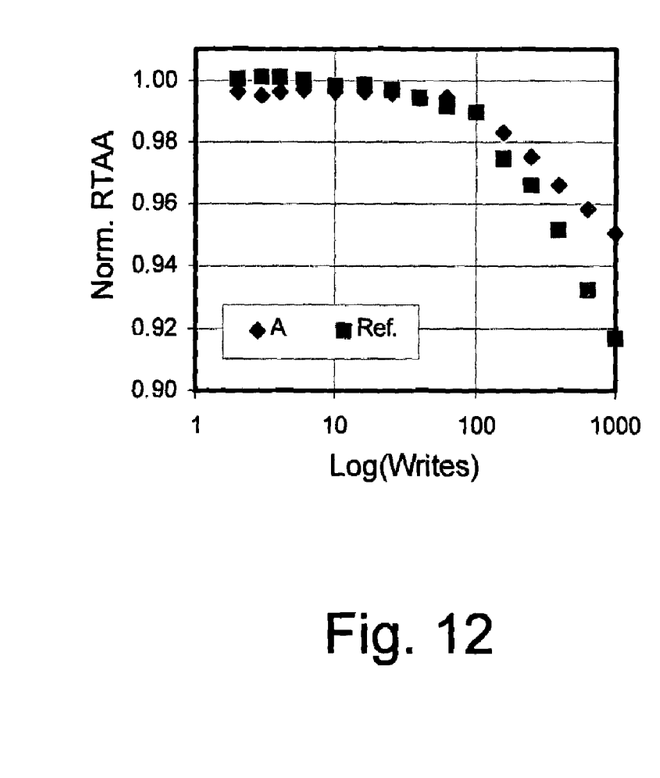
FIG. 12 illustrates a plot showing adjacent track erasure properties.

FIG. 12 illustrates the Adjacent Trace Erasure (ATE) due to repeated writing on a single test track. The plot shows the signal (RTAA) decay of one of the adjacent tracks due to fringing fields from the head during writing on the test track. Medium A shows more robustness to head fringing fields than the reference medium.

Table I illustrates the spectral signal to noise ratio (SpSNR) and the mid-frequency signal for the media illustrated in FIG. 9. The results for two methods of preconditioning are listed.

TABLE I

| Sample | AC | | Alternate | |
| --- | --- | --- | --- | --- |
| | Signal | SpSNR | Signal | SpSNR |
| Reference | 1.55 | 17.70 | 1.61 | 17.87 |
| A | 1.64 | 17.46 | 1.72 | 17.69 |
| B | 1.60 | 17.50 | 1.65 | 17.70 |

For the AC preconditioning case, a high frequency pattern is written over a wide area on each side of the test track. For the "alternate" case, a positive and a negative dc erase are alternately made near the test track, the pitch is approximately equal to the track width. For both preconditioning cases, the SpSNR is similar for the medium with and without pinning layers, demonstrating that this very important mid-frequency parameter is not affected by fringing fields from the perpendicular magnetic pinning layer.

Figure 13:
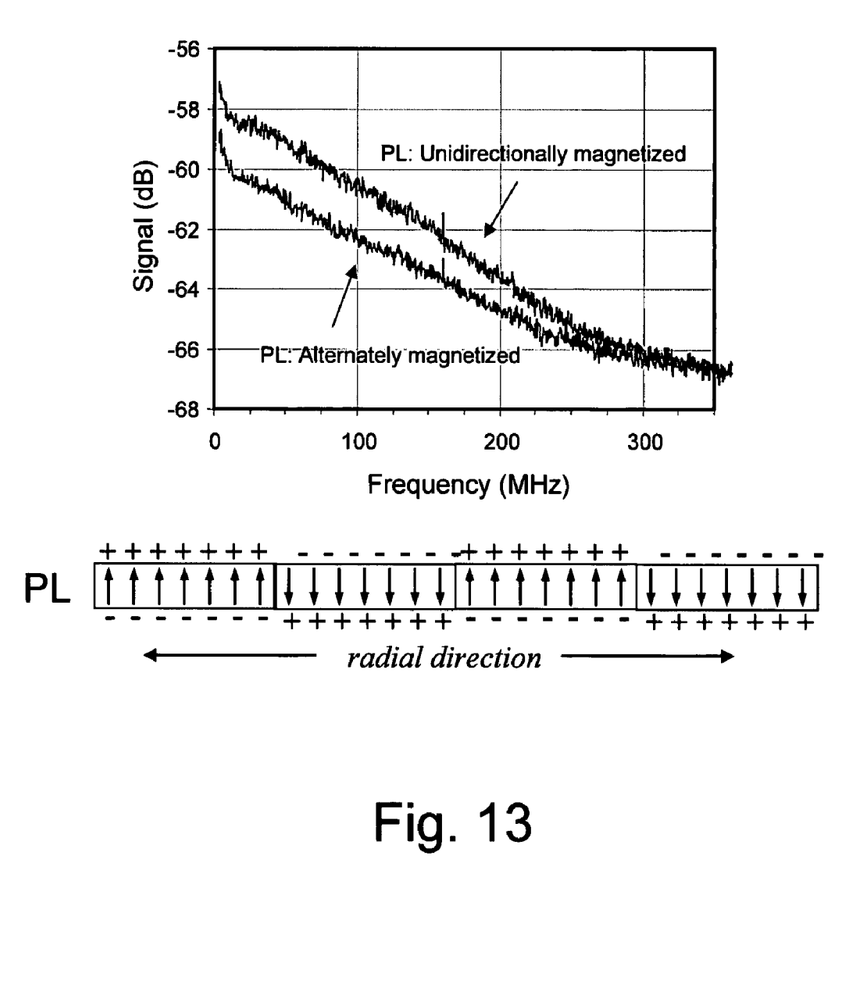
FIG. 13 illustrates a plot showing DC spectra of a recording medium according to an embodiment of the present invention wherein the pinning layer is magnetized in an alternate fashion.

FIG. 13 illustrates the effect of setting alternate (up and down) magnetizations on the pinning layer. This is done by alternately dc erasing adjacent tracks in the positive and negative directions with a "clock" ring head. Writing on the pinning layer is enabled due to the wide gap and write width of this head. The top layer is subsequently erased with a regular shielded monopole head without affecting the pinning layer.

FIG. 13 shows that the dc spectrum (or dc noise) is reduced compared to when the pinning layer is simply magnetized in one direction by an external magnet and the recording layer dc erased by a monopole head. Setting a checkered (up and down) magnetization pattern on the pinning layer should also reduce the stray fields but the ensuing transitions are also sensed by the head. Though the pinning layer in this case is decoupled from the soft layer by a carbon spacer, this technique also works for the case when the pinning layer is exchange coupled to the soft underlayer.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A magnetic recording medium, comprising:
   a) a substrate;
   b) a magnetically hard recording layer having perpendicular magnetic anisotropy disposed over said substrate;
   c) a magnetically soft underlayer disposed between said magnetically hard recording layer and said substrate; and
   d) a magnetic pinning layer disposed between said substrate and said soft magnetic underlayer, where said magnetic pinning layer has perpendicular magnetic anisotropy.

2. A magnetic recording medium as recited in claim 1, wherein said magnetic pinning layer is physically coupled with said magnetically soft underlayer.

3. A magnetic recording medium as recited in claim 1, wherein said magnetically soft underlayer is substantially free of domain walls.

4. A magnetic recording medium as recited in claim 1, wherein said magnetically soft underlayer has a magnetic coercivity ($H_c$) of not greater than about 30 Oe.

5. A magnetic recording medium as recited in claim 1, wherein said magnetic pinning layer has a $M_rT$ value of at least about 0.3 memu/cm$^2$ and not greater than about 1.0 memu/cm$^2$.

6. A magnetic recording medium as recited in claim 1, wherein said magnetic pinning layer comprises a ferromagnetic material.

7. A magnetic recording medium as recited in claim 1, wherein said magnetic pinning layer comprises an alloy of Co.

8. A magnetic recording medium as recited in claim 7, wherein said alloy of Co further comprises Cr.

9. A magnetic recording medium as recited in claim 1, wherein said magnetic pinning layer comprises an alloy of Co selected from the group consisting of CoCr, CoCrTa, CoPt, FePt, and CoCrPt-oxide.

10. A magnetic recording medium as recited in claim 1, wherein said magnetic pinning layer comprises a ferromagnetic alloy, said ferromagnetic alloy comprising at least a rare earth element and a transition metal.

11. A magnetic recording medium as recited in claim 10, wherein said are earth element is selected from the group consisting of Gd, Tb, Dy and combinations thereof.

12. A magnetic recording medium as recited in claim 11, wherein said transition metal is selected from the group consisting of Fe, Co and combinations thereof.

13. A magnetic recording medium as recited in claim 1, wherein said medium is a circular medium having an inner diameter and an outer diameter and wherein said magnetic pinning layer has a reduced thickness near said outer diameter.

14. A magnetic recording medium as recited in claim 1, wherein said magnetic pinning layer is a second magnetic pinning layer and wherein said magnetic recording medium comprises a pinning layer structure, said pinning layer structure comprising a first and said second magnetic pinning layers anti-ferromagnetically coupled through a non-magnetic spacer layer disposed between said first and second magnetic pinning layers.

15. A magnetic recording medium as recited in claim 14, wherein said magnetic pinning layer structure has an effective $M_r t$ of zero and said first and second magnetic pinning layers each comprise an element selected from the group consisting Co, Fe and combinations thereof.

16. A magnetic recording medium as recited in claim 15, wherein said non-magnetic spacer layer comprises an element selected from the group consisting of Ru and Cr.

17. A magnetic recording medium as recited in claim 14, wherein said non-magnetic spacer layer has a thickness of at least about 0.5 nanometers and not greater than about 1.0 nanometers.

18. A magnetic recording medium as recited in claim 1, further comprising a seedlayer disposed between said substrate and said magnetic pinning layer.

19. A magnetic recording medium as recited in claim 18, wherein said seedlayer comprises a material selected from the group consisting of Cr, MgO, Mo, Nb, NiTa, Ru, $Si_3N_4$, Ta, Ti, W and combinations thereof.

20. A magnetic recording medium as recited in claim 1, wherein said magnetically soft underlayer has radial magnetic anisotropy.

21. A magnetic recording medium as recited in claim 1, wherein said magnetically soft underlayer comprises a magnetic alloy selected from the group consisting of CoZrNb, CoZrTa, FeCoB, NiFe, NiFeNb, NiFeMo and FeAlSi.

22. A magnetic recording medium as recited in claim 1, wherein said magnetically soft underlayer has a thickness of from about 50 nanometers to about 300 nanometers.

23. A magnetic recording medium as recited in claim 1, wherein said soft magnetic underlayer is a first soft magnetic underlayer, and wherein said magnetic recording medium comprises a soft underlayer structure, said soft underlayer structure comprising said first soft underlayer and a second soft underlayer and a non-magnetic spacer layer separating said first and second soft underlayers.

24. A magnetic recording medium as recited in claim 23, wherein said soft underlayer structure has a total thickness of from about 50 nanometers to about 300 nanometers.

25. A magnetic recording medium as recited in claim 1, wherein said magnetic recording medium further comprises an intermediate layer physically coupled to said magnetic recording layer, wherein said intermediate layer comprises a material having an hcp crystalline structure.

26. A magnetic recording medium as recited in claim 25, wherein said intermediate layer has a thickness of from about 3 nanometers to about 50 nanometers.

27. A magnetic recording medium as recited in claim 25, wherein said intermediate layer comprises a material selected from the group consisting of NiTa, CoCrRu, Re, Ru, Os and combinations thereof.

28. A magnetic recording medium as recited in claim 1, wherein said hard magnetically hard recording layer comprises an alloy selected from the group consisting of CoCrPt, CoCrPtO, CoPT, CoPd and FePt.

29. A recording apparatus, comprising:
  a) a disk medium, said disk medium comprising:
    i) a substrate;
    ii) a magnetically hard recording layer having perpendicular magnetic hard anisotropy disposed over said substrate;
    iii) a magnetically soft underlayer disposed between said magnetically hard recording layer and said substrate; and
    iv) a magnetic pinning layer disposed between said substrate and said soft magnetic underlayer where said magnetic pinning layer has perpendicular anisotropy; and
  b) a read-write head adapted to read and write magnetic bits on said disk medium.

30. A recording apparatus as recited in claim 29, wherein said read-write head comprises a shielded pole writer.

31. A recording apparatus as recited in claim 29, wherein said recording apparatus is a hard disk drive.

32. A recording apparatus as recited in claim 29, wherein said magnetically soft underlayer is substantially free of domain walls.

* * * * *

UNITED STATES PATENT AND TRADEMARK OFFICE
CERTIFICATE OF CORRECTION

PATENT NO.       : 7,588,842 B1                          Page 1 of 1
APPLICATION NO.  : 11/218771
DATED            : September 15, 2009
INVENTOR(S)      : Abarra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

Twenty-first Day of September, 2010

David J. Kappos
*Director of the United States Patent and Trademark Office*